(12) United States Patent
Hsieh

(10) Patent No.: US 8,932,185 B2
(45) Date of Patent: Jan. 13, 2015

(54) BRAKE DEVICE WITH BUILT-IN POWER GENERATION MECHANISM AND PERMANENT MAGNETISM EDDY CURRENT

(75) Inventor: Li-Min Hsieh, Hsinchu County (TW)

(73) Assignee: Chi Hua Fitness Co., Ltd., Hsinchu County (TW)

( * ) Notice: Subject to any disclaimer, the term of this patent is extended or adjusted under 35 U.S.C. 154(b) by 350 days.

(21) Appl. No.: 13/562,583

(22) Filed: Jul. 31, 2012

(65) Prior Publication Data
US 2014/0035414 A1    Feb. 6, 2014

(51) Int. Cl.
*A63B 21/005*    (2006.01)
*H02K 49/04*    (2006.01)
*B60L 7/28*    (2006.01)

(52) U.S. Cl.
USPC ............... 482/63; 482/5; 188/164; 188/267; 310/105

(58) Field of Classification Search
USPC ............ 310/77, 105; 188/164, 158, 267; 482/5–7, 63, 903
See application file for complete search history.

(56) References Cited

U.S. PATENT DOCUMENTS

| | | | | |
|---|---|---|---|---|
| 5,711,404 A * | 1/1998 | Lee | | 188/164 |
| 5,848,953 A * | 12/1998 | Wei et al. | | 482/63 |
| 5,851,165 A * | 12/1998 | Wei et al. | | 482/63 |
| 6,084,325 A * | 7/2000 | Hsu | | 310/74 |
| 6,273,845 B1 * | 8/2001 | Liou | | 482/63 |
| 6,345,703 B1 * | 2/2002 | Peng | | 188/164 |
| 6,360,855 B1 * | 3/2002 | Szu-Yin | | 188/161 |
| 6,585,087 B2 * | 7/2003 | Lin | | 188/164 |
| 6,952,063 B1 * | 10/2005 | Chen | | 310/93 |
| 7,018,324 B1 * | 3/2006 | Lin | | 482/63 |
| 7,451,859 B2 * | 11/2008 | Yin | | 188/267 |
| 7,732,961 B2 * | 6/2010 | Lin | | 310/153 |
| 7,845,475 B2 * | 12/2010 | Lin | | 188/164 |
| 8,026,647 B2 * | 9/2011 | Seo | | 310/105 |
| 2008/0261775 A1 * | 10/2008 | Chang et al. | | 482/5 |
| 2010/0069205 A1 * | 3/2010 | Lee et al. | | 482/63 |

* cited by examiner

*Primary Examiner* — Burton Mullins
(74) *Attorney, Agent, or Firm* — Rosenberg, Klein & Lee

(57) ABSTRACT

A brake device with built-in power generation mechanism and permanent magnetism eddy current comprises: an external rotator including a flywheel and a permanent magnet fixed at an inner periphery of the flywheel; an internal stator including a fixing bracket and a tile-shaped armature mounted at an outer periphery of the fixing bracket; a brake mechanism including a magnetic-conductive plate; when the external rotator is rotated the tile-shaped armature generates a three-phase alternating current, and the arc-shaped metal plate generates eddy current and braking torque of magnetic resistant; a cooling fan mounted on the flywheel to produce a cooling effect; an adjustment mechanism provided for adjusting a gap between the arc-shaped metal plate and the permanent magnet to adjust magnetic flux, and thus change the braking resistant load; a controller transferring the three-phase alternating current into direct current for required power of the control panel and server.

4 Claims, 11 Drawing Sheets

US 8,932,185 B2

BRAKE DEVICE WITH BUILT-IN POWER GENERATION MECHANISM AND PERMANENT MAGNETISM EDDY CURRENT

BACKGROUND OF THE INVENTION

1. Field of the Invention

The invention relates to a brake device with built-in power generation mechanism and permanent magnetism eddy current, and more particularly to apply on fitness equipment having an integrated power generation function and adjustable braking resistance device.

2. Description of the Related Art

Most fitness equipment includes a flywheel therein to increase the rotational inertia, and the flywheel may be used as a load in order to achieve fitness effects. With reference to FIGS. 1-1 to 1-3, U.S. Pat. No. 5,711,404 discloses a magnetic adjustable loading device with eddy current comprising: a rotator (not shown) having a flywheel 710 and a metal conductor 720 and a stator 750 having a magnetic plate 751 and a permanent magnet 752 and mounted at an inner periphery of the rotator. With the reference to FIGS. 1-2 and 1-3, a gap d1 between the stator 750 and the flywheel 710 and metal conductor 720 is changed by an adjusting means 770 and a braking means 780 in order to change the magnetic flux density. The braking means 780 has a cable 781 connected to an adjusting element 771 of the adjusting means 770; such that when pulling the cable 781, the adjusting element 771 in a groove 743 moves upward, and a free end of the magnetic plate 751 as shown in FIG. 1-2 is free to move. On the other hand, when loosening the cable 781, a spring 753 allows the free end of the magnetic plate 751 as shown in FIG. 1-3 to return to the original position. The magnetic flux density is changed by the radial displacement of the free end of the magnetic plate 751 in order to achieve the effect of continuous adjustment of load resistance. However, the braking means 780 is operated for adjusting the loading resistance by the user, lacking of automatically adjustment function.

With reference to FIGS. 2-1 and 2-2, U.S. Pat. No. 6,084,325 discloses a brake device with a combination of power-generating and eddy-current magnetic resistance. A rotating wheel A of athletic equipment drives a flywheel 820 to rotate, and a permanent magnet 821 with the flywheel 820 and a stator core 830 together form a magnetic circuit for a coil 831 to generate a current. The current then is changed into direct current through rectification and filtration in order to provide the power to a display & control gauge 890 and a brake core 850 mounted at a side edge of the flywheel 820; such that the brake core 850 forms an eddy-current to produce magnetic resistance. With reference to FIG. 3, U.S. Pat. No. 7,732,961 discloses a combined generator with built-in eddy-current magnetic resistance having a similar applied principle with the above-mentioned U.S. Pat. No. 6,084,325. The only difference is that a brake core 980 disclosed in U.S. Pat. No. 7,732,961 is mounted at an inner periphery of a flywheel 920 instead of being mounted at the side edge of the flywheel 820.

In the aforementioned patents as shown in FIGS. 2-1 to 3, the user imposed the kinetic energy on the athletic equipment to generate the electric power, and electric power is then fed back to produce the magnetic resistance, forming the load of exercise applied force. This kind of structure may achieve an excellent movement effect but may be complex and may cause high manufacturing costs, and thus it is only suitable for installing in larger athletic equipment and athletic equipment with more controlling functions but not suitable for athletic equipment with small resistance and low costs. Moreover, loading adjustment of the aforementioned patents lacks automation. Therefore, there is room for improvement.

SUMMARY OF THE INVENTION

It is a primary object of the present invention to provide a built-in power generation and braking load device, which also provides an automatic braking load adjustment device.

In order to achieve the above objects, the invention includes: a fixed shaft having a fixed segment at both ends for fixing on a support base of athletic equipment; a driven wheel pivotally connected to an end of the fixed shaft to transmit kinetic energy imposed by a user on athletic equipment; an external rotator including a flywheel and a permanent magnet fixed at an inner periphery of the flywheel, the permanent magnet provided for an electric power generation and an eddy current brake, the flywheel connected to the driven wheel and unidirectionally rotated on the driven wheel by an unidirectional bearing; a cooling fan mounted on the flywheel and simultaneously rotated with the flywheel to produce a cooling effect; an internal stator including a fixing bracket and a tile-shaped armature mounted at an outer periphery of the fixing bracket, and a rotation of the external rotator allowing the tile-shaped armature to generate a three-phase alternating current being output by an output line connected to the tile-shaped armature; a brake mechanism including two pieces of magnetic-conductive plate symmetrically mounted on a left and right side of the fixing bracket and two pieces of arc-shaped metal plate mounted at an outer periphery of the magnetic-conductive plate, and a gap being between the arc-shaped metal plate and the permanent magnet and thus the rotation of the external rotator allowing the arc-shaped metal plate to generate eddy current and reluctance braking torque; an adjustment mechanism connected to the magnetic-conductive plate to adjust the gap between the arc-shaped metal plate and the permanent magnet; a controller transferring the three-phase alternating current from the output line of the tile-shaped armature into direct current for a required power of the control panel, and the server.

BRIEF DESCRIPTION OF THE DRAWINGS

FIG. 1-2 is a schematic view of a conventional magnetic adjustable loading device with eddy current, illustrating after the adjustment;

FIG. 1-3 is a schematic view of a conventional magnetic adjustable loading device with eddy current, illustrating before the adjustment;

FIG. 2-1 is an elevational view of a conventional brake device with a combination of power-generating and eddy-current magnetic resistance;

FIG. 2-2 is a schematic view of the overall control of a conventional brake device with a combination of power-generating and eddy-current magnetic resistance;

FIG. 3 is a schematic view of a conventional combined generator with built-in eddy-current magnetic resistance;

DETAILED DESCRIPTION OF THE PREFERRED EMBODIMENT

Figure 1:
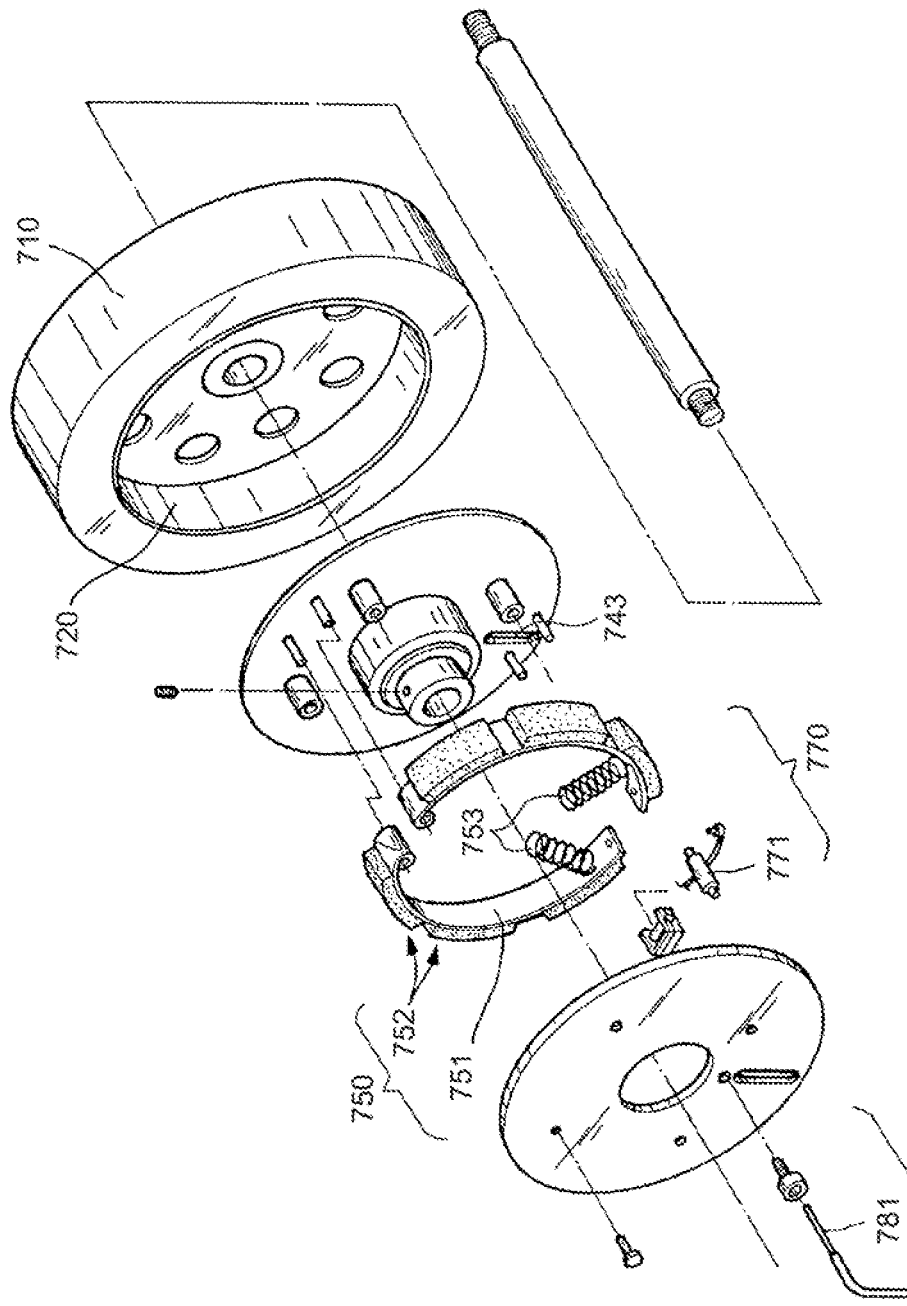
FIG. 1-1 is an exploded perspective view of a conventional magnetic adjustable loading device with eddy current.
Figures 1, 2:
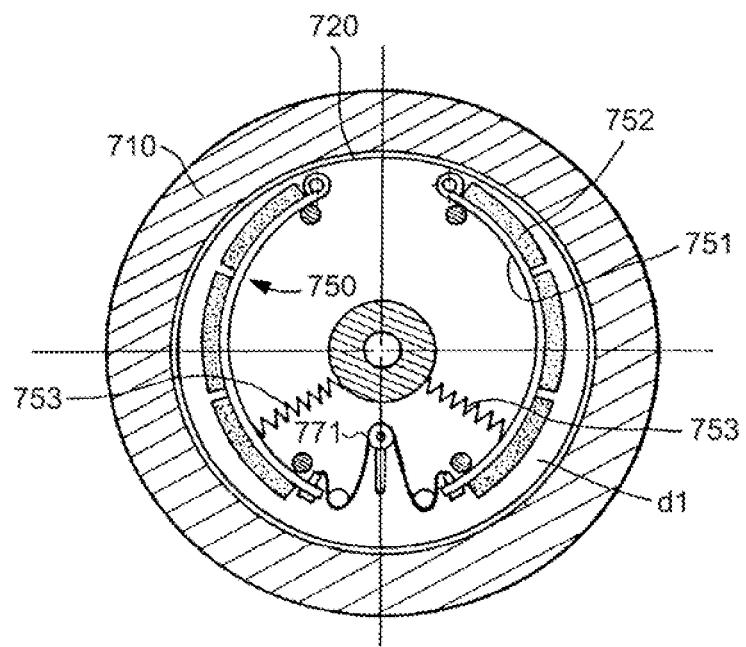
Figures 1, 2, 3:
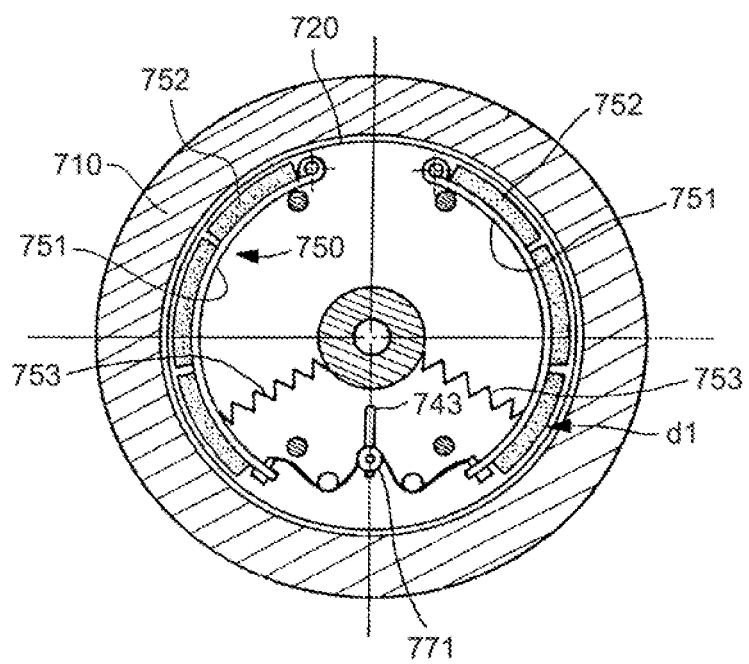
Figures 1, 2:
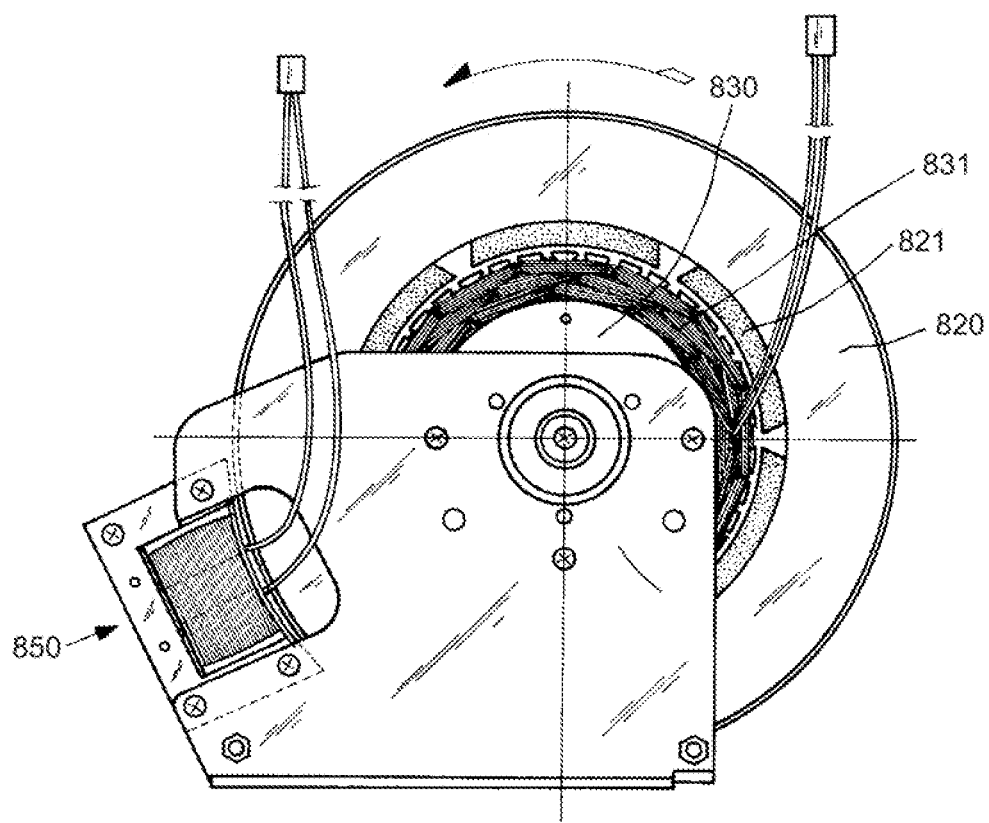
Figure 2:
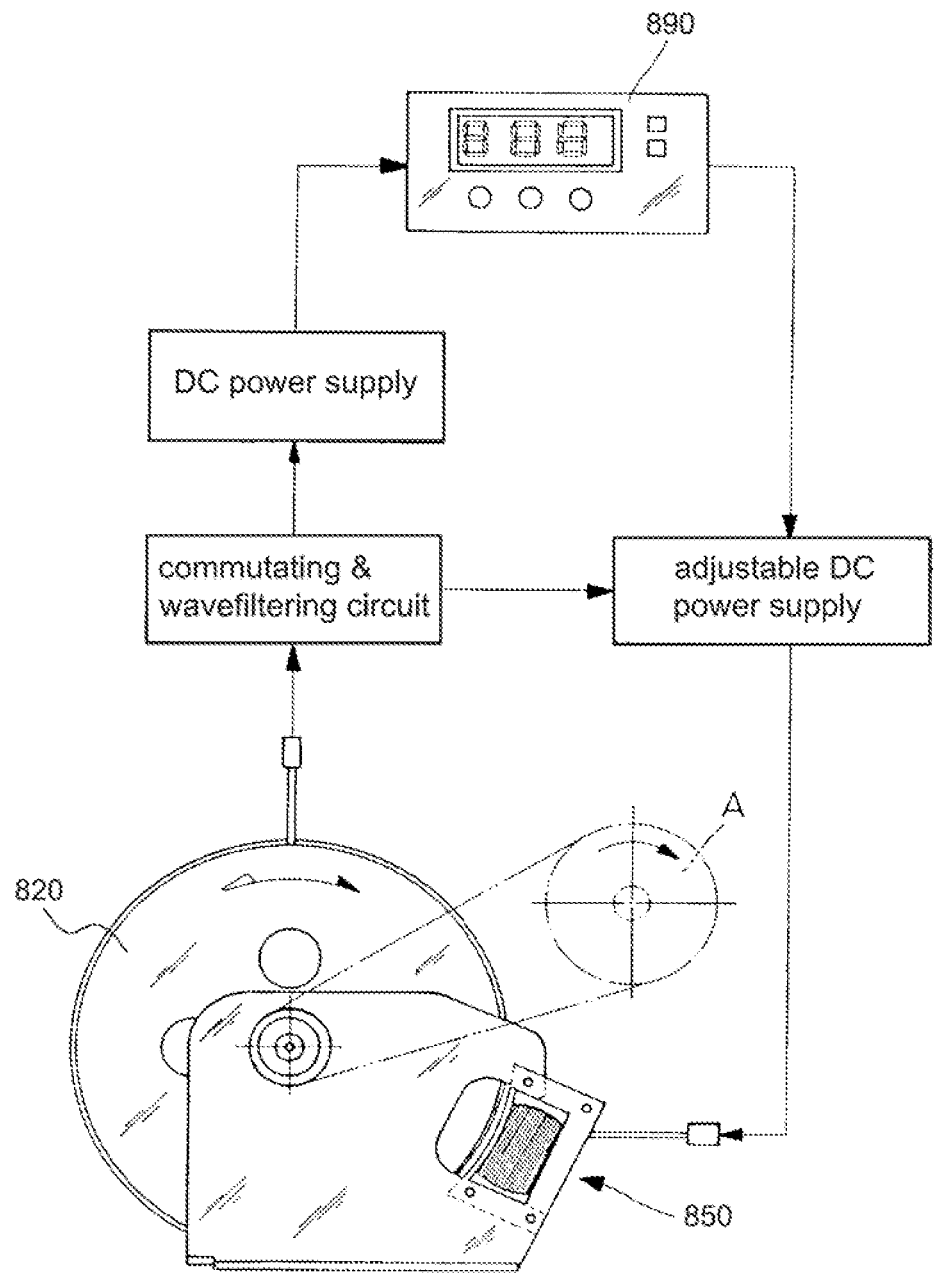
Figure 3:
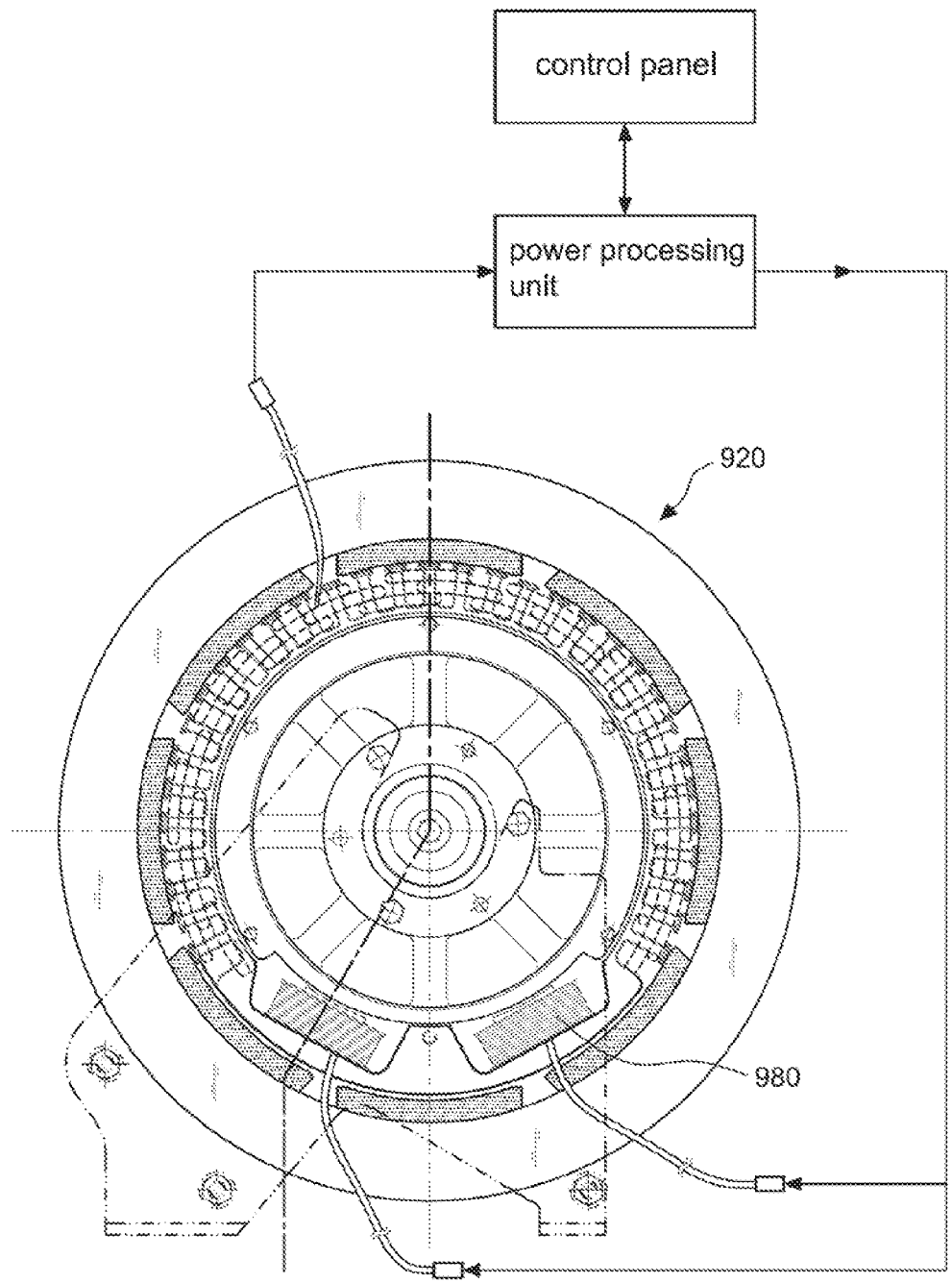

Referring to FIGS. 4 through 9, the preferred embodiment of a brake device with built-in power generation mechanism and permanent magnetism eddy current in accordance with the present invention comprises: a fixed shaft 10, a driven wheel 11, an external rotator 20, a cooling fan 27, an internal stator 30, a brake mechanism 40, an adjustment mechanism 50, and a controller 61.

The fixed shaft 10 includes a fixed segment 11 at both ends and an assembled segment 12 in middle thereof for fixing on a support base of athletic equipment.

The driven wheel 13 is provided for passing kinetic energy imposed by a user on athletic equipment. In this embodiment, the driven wheel 13 is a pulley having a toothing surface 131 to join a belt, so that the pulley 13 is connected to a rotating wheel of the athletic equipment. A bearing hole 132 is provided for mounting a ball bearing 14 and joining the assembled segment 12 of the fixed shaft 10, and a buckle 15 is provided for fixing the ball bearing 14, so that the pulley 13 is able to pivotally rotate on the fixed shaft 10.

The external rotator 20 includes a flywheel 21 and a permanent magnet 22 fixed at an inner periphery of the flywheel 21. The flywheel 21 has a disc body 211 axially and outward extended to form a ring body 212, and an indentation 213 is formed between an inner periphery of the ring body 212 and the disc body 211. The permanent magnet 22 is an annular structure having an outer periphery sticking to the inner periphery of the ring body 212, so that the flywheel 21 and the permanent magnet 22 are combined into one body. Moreover, the disc body 211 has a flange 214, and a big bearing hole 215 and small bearing hole 216 arranged at a middle part thereof. The big bearing hole 215 is provided not only for mounting a unidirectional bearing 23 and a sleeve 24 but for joining an outer periphery of a convex axle 133 of the pulley 13, so that the external rotator 20 is able to unidirectionally rotate on the pulley 13. On the other hand, the small bearing hole 216 is provided for mounting a ball bearing 25 and joining the assembled segment 12 of the fixed shaft 10, and a buckle 26 is provided for fixing the ball bearing 25, so that the external rotator 20 is able to simultaneously rotate on the fixed shaft 10.

The cooling fan 27 includes a plate surface 271, a plurality of blades 272, and an axle hole 273 mounted on the flange 214 of the flywheel 21. The plate surface 271 has a plurality of screw holes 274 and is fixed on the disc body 211 by a plurality of screws 28, so that the cooling fan 27 is arranged in the indentation 213 of the flywheel 21 and simultaneously rotated with the flywheel 21 to produce a cooling effect.

Figure 4:
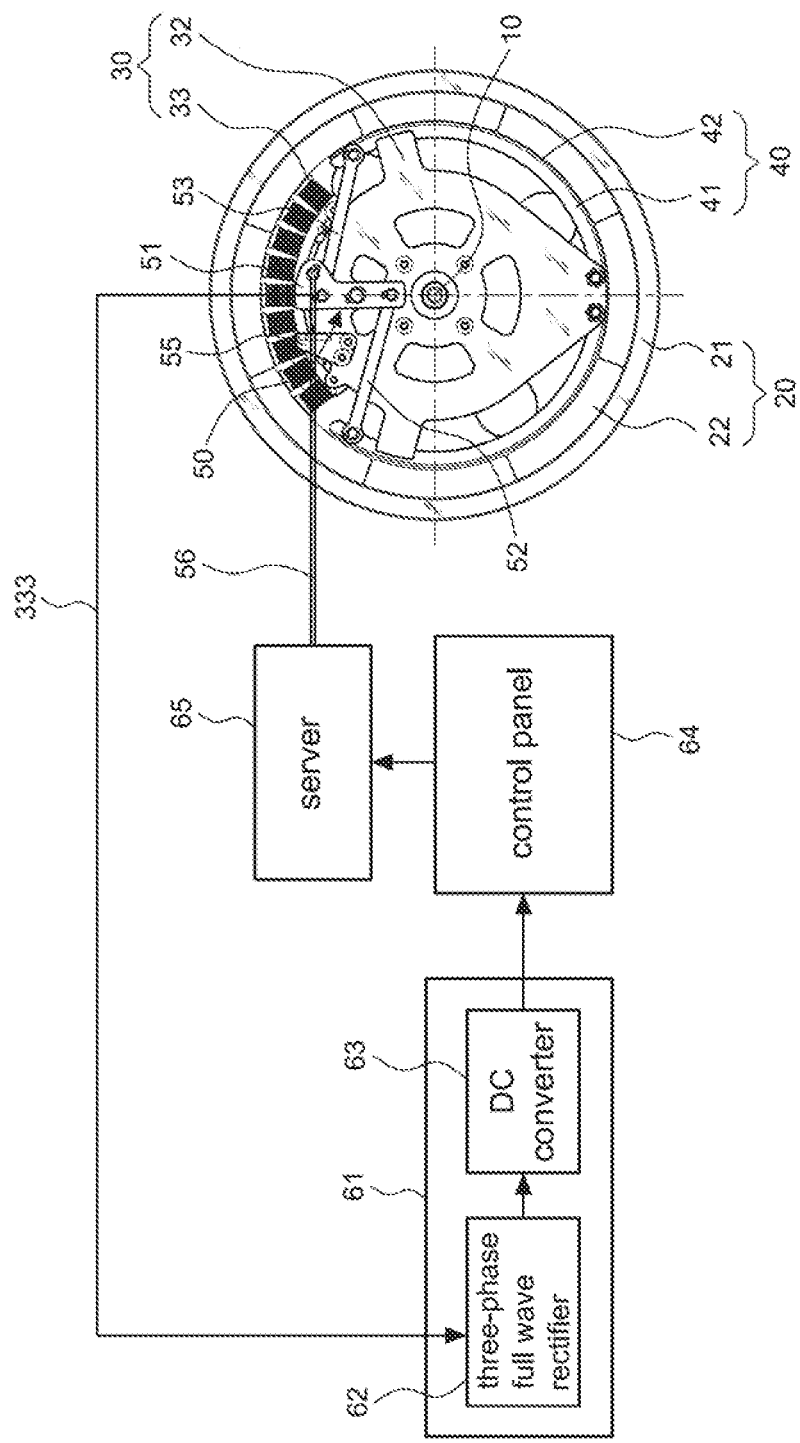
FIG. 4 is a schematic view of the preferred embodiment of the present invention.
Figure 5:
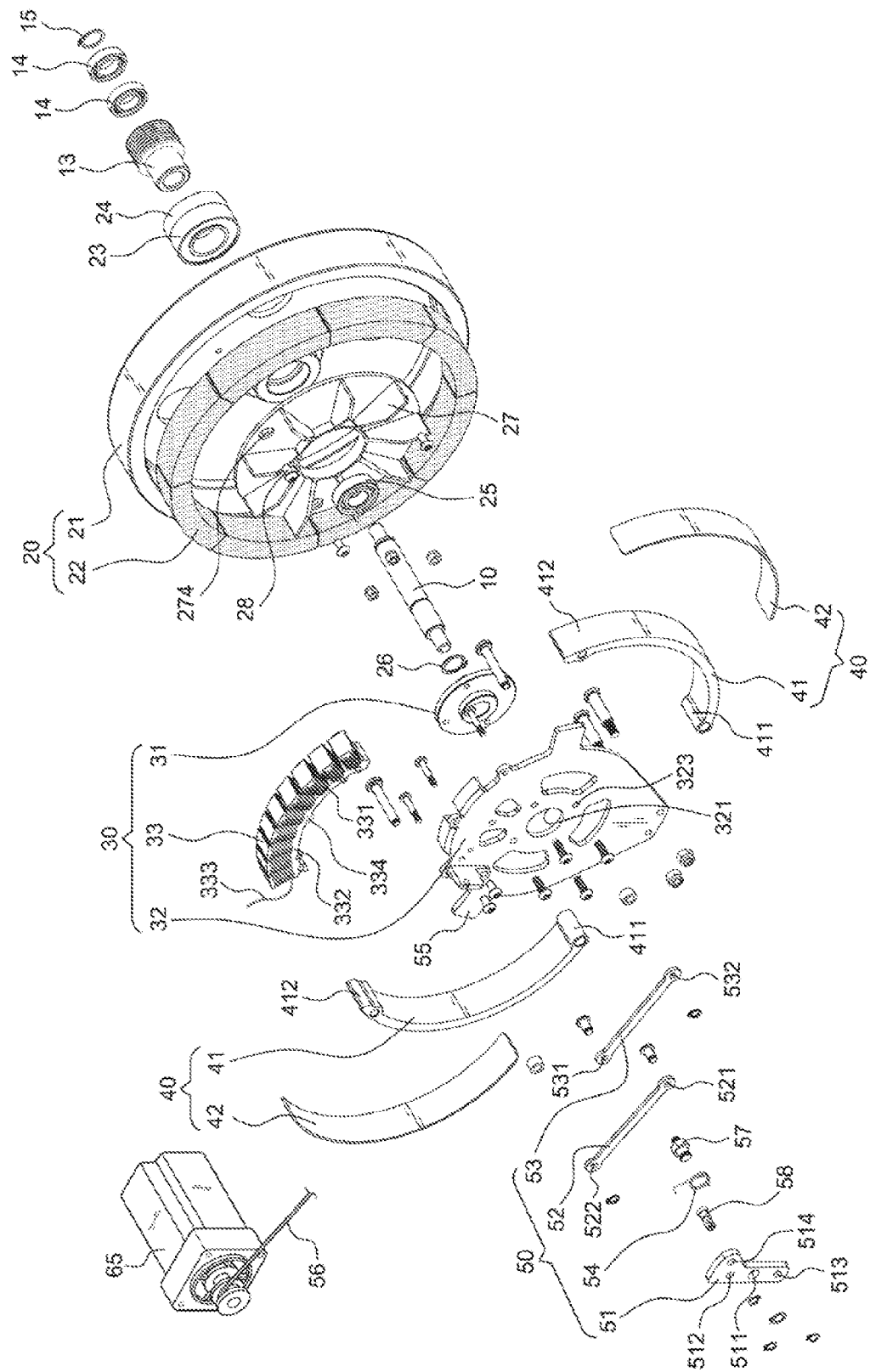
FIG. 5 is an exploded perspective view of the preferred embodiment of the present invention.
Figure 6:
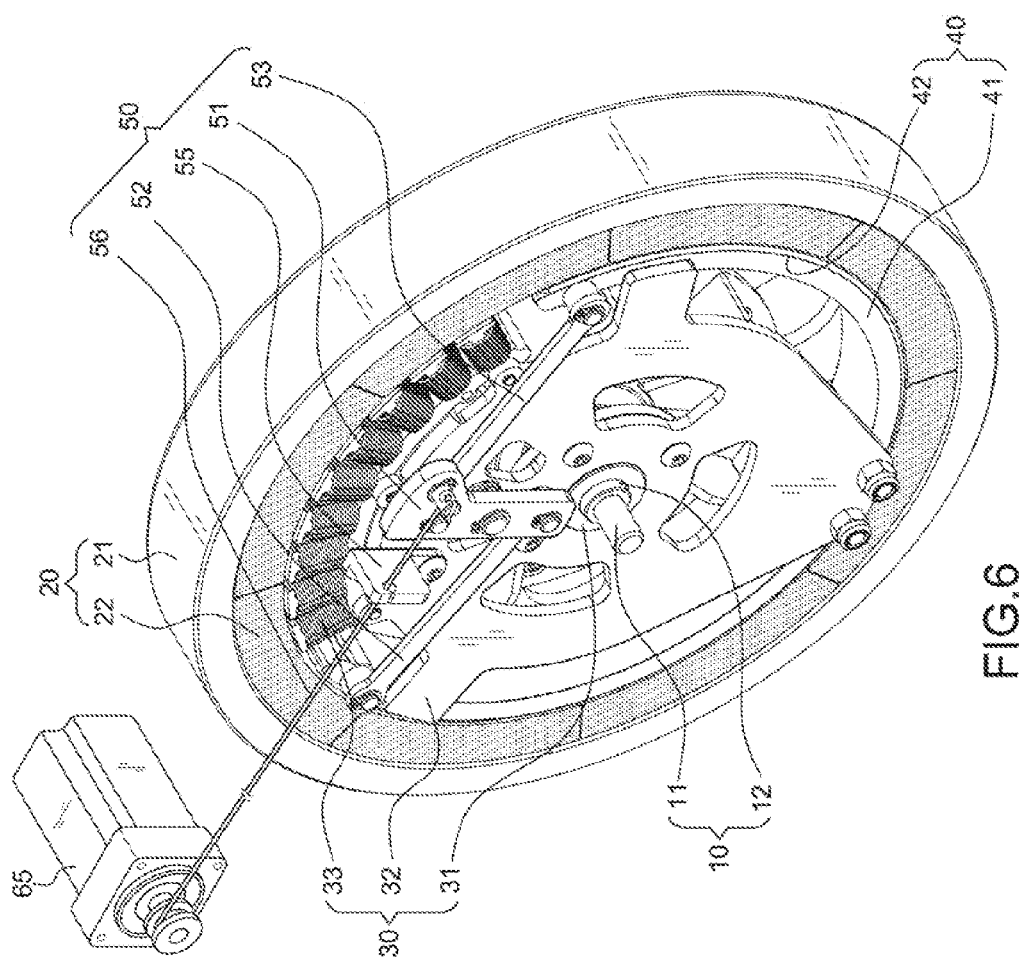
FIG. 6 is a perspective view of preferred embodiment of the present invention in a fully assembled state.

The internal stator 30 includes a fixing sleeve 31, a fixing bracket 32, and a tile-shaped armature 33. The fixing sleeve 31 has an axle hole 311 mounted at an inner side of the assembled segment 12 of the fixed shaft 10, a plate surface 312, and a flange 313. The fixing sleeve 31 is fixed on the fixed shaft 10 and located in the indentation 213 of the flywheel 21. The fixing bracket 32 has an axle hole 321 mounted on the flange 313 of the fixing sleeve 31 and a fixed surface 322 having four bolt holes 323 for the fixing bracket 32 to be fixed on the plate surface 312 of the fixing sleeve 31 by four bolts and nuts. The tile-shaped armature 33 has a current-generating coil 331 arranged at an outer periphery thereof and a core holder 332 arranged at an inner periphery thereof. The current-generating coil 331 is connected to an output line 333, and the core holder 332 has three bolt holes 334 for the core holder 332 to be fixed at a lower side of an outer periphery of the fixing bracket 32 by three bolts and nuts; such that, the current-generating coil 331 of the tile-shaped armature 33 is adjacent to an inner periphery of the permanent magnet 22, and a rotation of the external rotator 20 allows the current-generating coil 331 to generate a three-phase alternating current being output by the output line 333. In this embodiment, as shown in FIG. 4, an outer periphery of the current-generating coil 331 is a quarter of a circumference. Therefore, when the permanent magnet 22 rotates in a circle, the frequency and voltage generated by the current-generating coil 331 is increased to 4 times; such that, the external rotator 20 at low rotation speed is able to provide the required power for the control panel 64, and the server 65.

The brake mechanism 40 includes two pieces of magnetic-conductive plate 41 and two pieces of arc-shaped metal plate 42, and each of the two pieces of magnetic-conductive plate 41 has a fixed end 411 with a bolt hole and an adjusted end 412. The two pieces of magnetic-conductive plate 41 are symmetrically fixed at an upper side of the outer periphery of the fixing bracket 32 by a bolt and nut, and the two pieces of arc-shaped metal plate 42 is respectively fixed at an outer periphery of the two pieces of magnetic-conductive plate 41. Due to a gap between the arc-shaped metal plate 42 and the permanent magnet 22, the rotation of the external rotator 20 allows the arc-shaped metal plate 42 to generate eddy current and reluctance braking torque.

The adjustment mechanism 50 includes a lever 51, a left connecting rod 52, a right connecting rod 53, a torsion spring 54, a pull rope holder 55, and a pull rope 56. The lever 51 has a central hole 511, an upper action. hole 512, a lower action hole 513, and a applied force hole 514. The central hole 511 is pivotally connected to the fixed surface 322 of the fixing bracket 32 by a central shaft 57.

Figure 7:
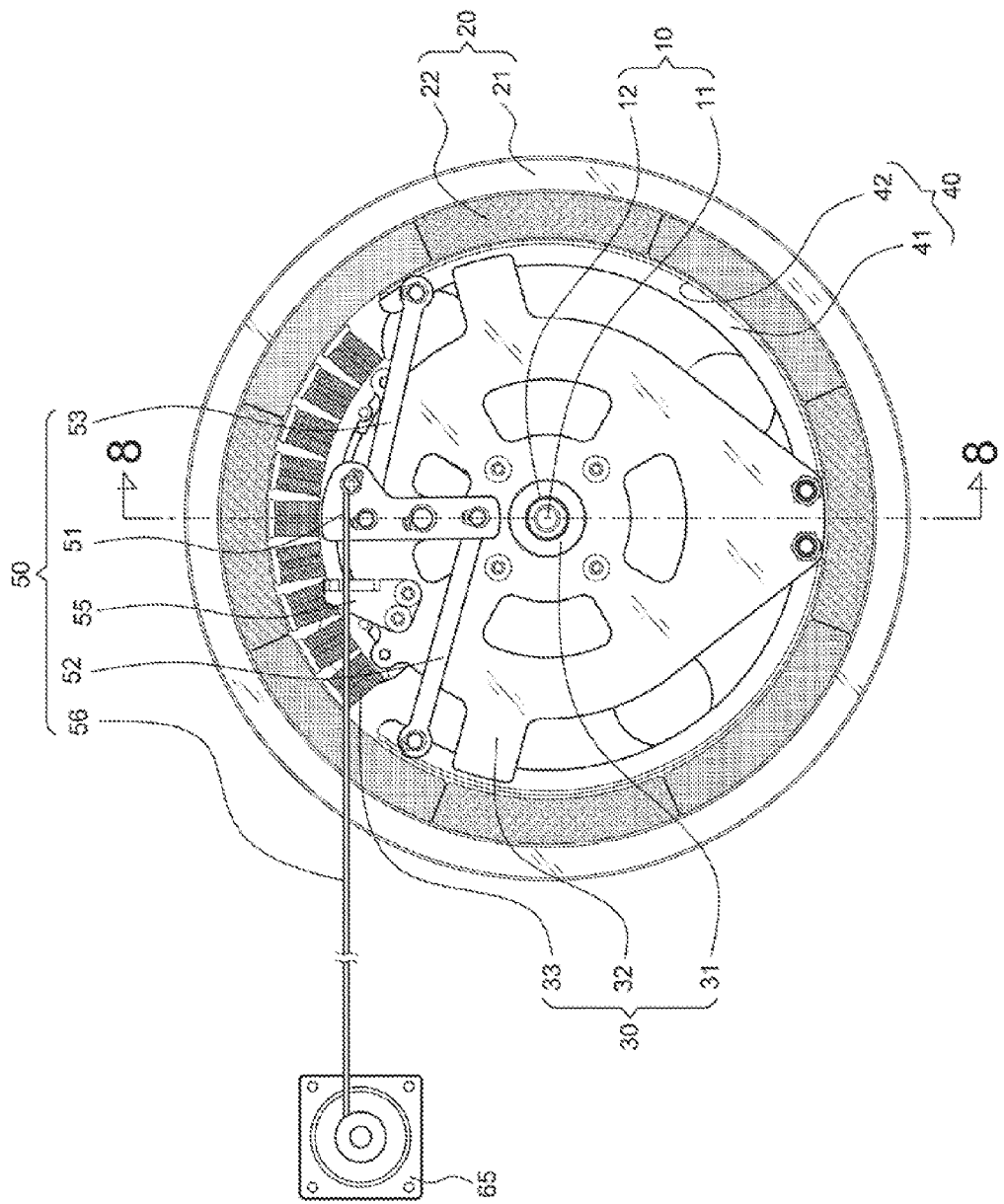
FIG. 7 is a front elevational view of preferred embodiment of the present invention in a fully assembled state.
Figure 8:
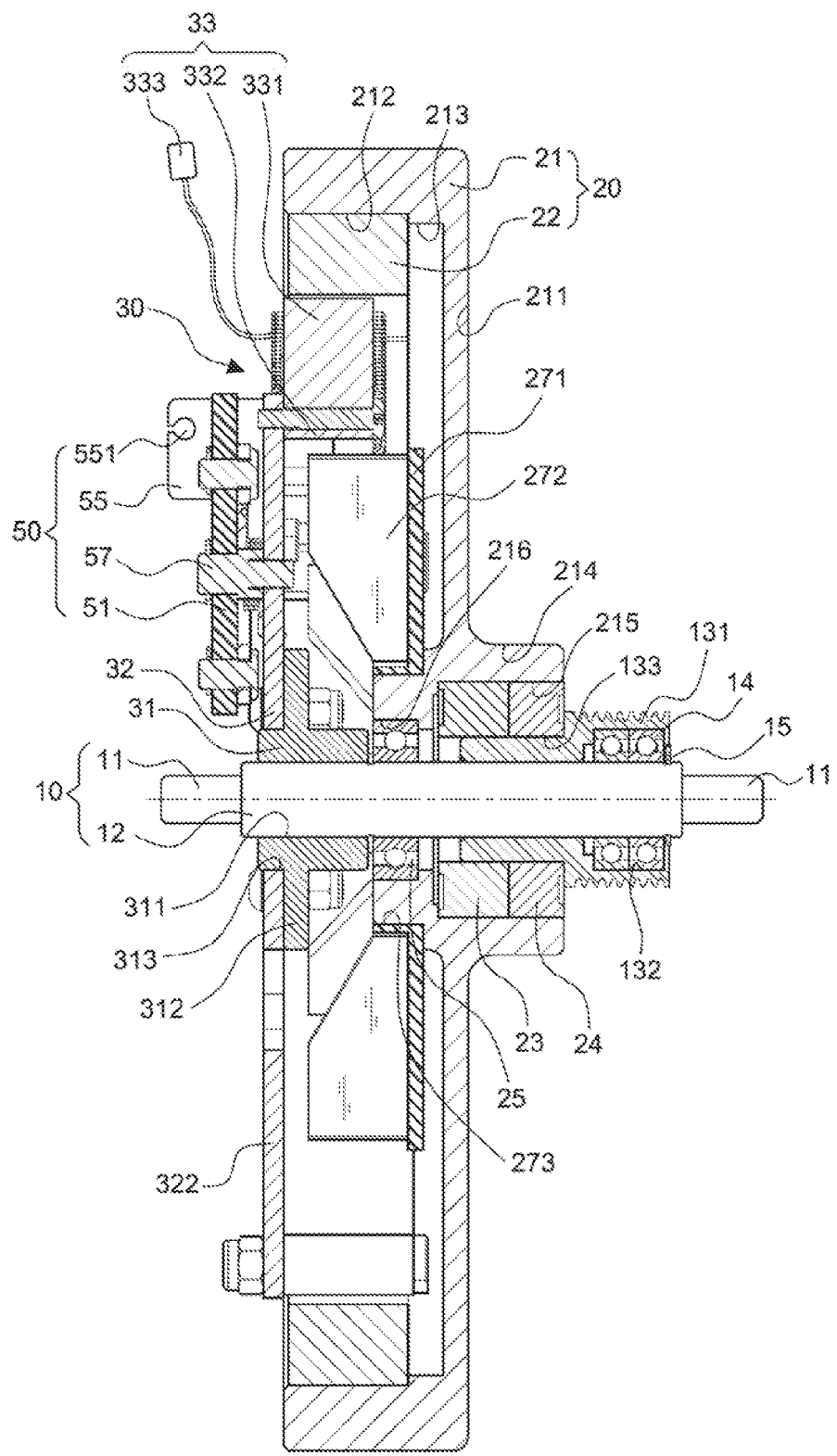
FIG. 8 is a sectional view of preferred embodiment of the present invention in a fully assembled state.
Figure 9:
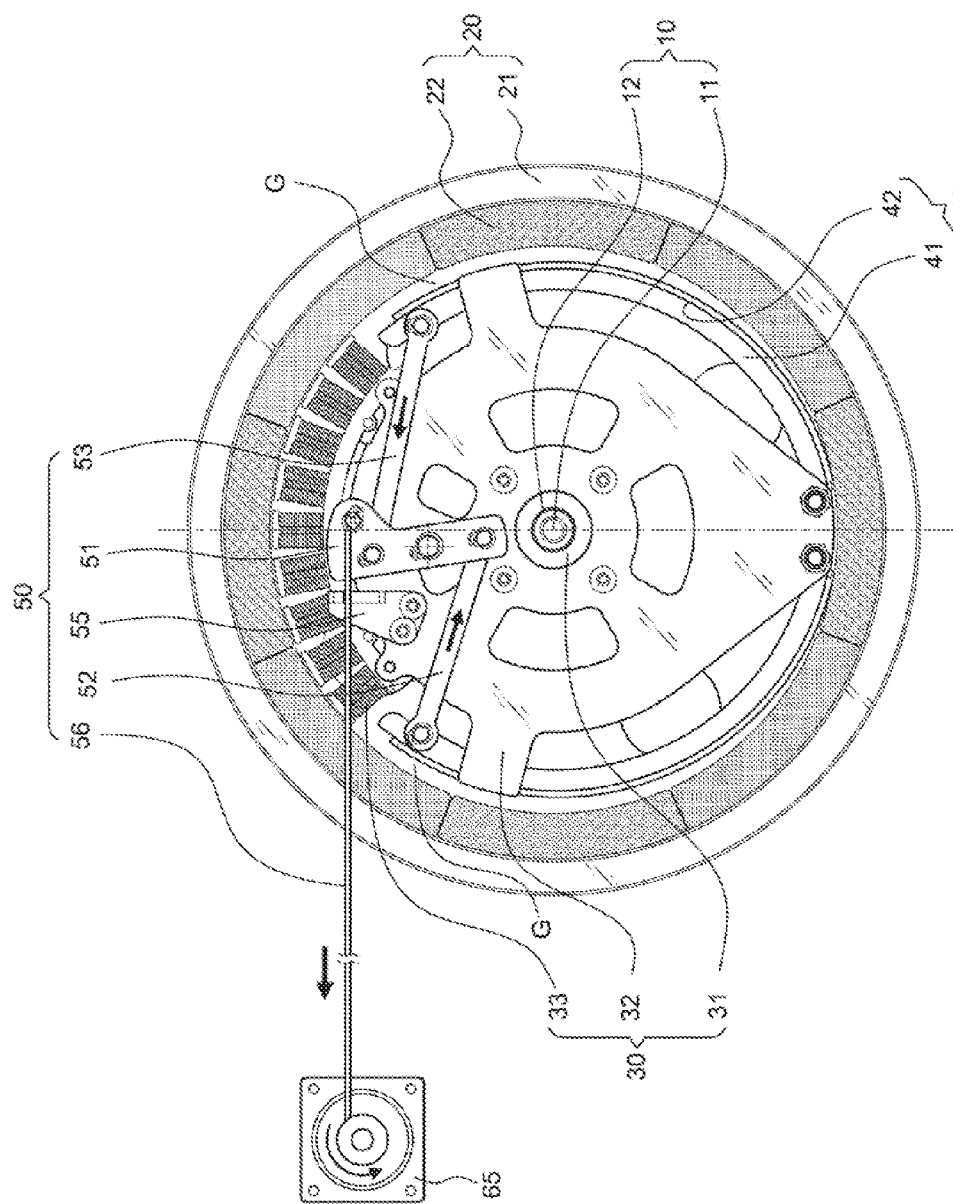
FIG. 9 is a schematic view of preferred embodiment of the present invention, illustrating after the adjustment of the magnetic resistant.

The left connecting rod 52 has an applied force end 521 pivotally connected to the lower action hole 513 of the lever 51 and a connection end 522 pivotally connected to the adjusted end 412 of the magnetic-conductive plate 41 mounted at left side of the fixing bracket 32. On the other hand, the right connecting rod 53 has an applied force end 531 pivotally connected to the upper action hole 512 of the lever 51 and a connection end 532 pivotally connected to the adjusted end 412 of the magnetic-conductive plate 41 mounted at right side of the fixing bracket 32. The pull rope holder 55 has a retaining hole 551 fixed on the fixed surface 322 of the fixing bracket 32 and a pull bolt 58 mounted on the applied force hole 514 of the lever 51. An end of the pull rope 56 is connected to the pull bolt 58; another end thereof passes through the retaining hole 551 of the pull rope holder 55 to connect to an applied force source. The torsion spring 54 is mounted on the central shaft 57 and having both ends respectively connected to the left connecting rod 52 and the right connecting rod 53. With reference to FIG. 9, when pulling the pull rope 56, the lever 51 has a central hole 511 as a center for counter-clockwise rotation, and the connections of the upper action hole and right connecting rod 512, 53 and the lower action hole and left connecting rod 513, 52 drive the adjusted end 412 of the magnetic-conductive plate 41 approaching toward the axis direction of the fixed shaft 10. At the same time, the gap G between the arc-shaped metal plate 42 and the permanent magnet 22 becomes larger. With reference to FIG. 7, when loosening the pull rope 56, the left connecting rod 52 and the right connecting rod 53 move toward the opposite direction, and the adjusted end 412 of the magnetic-conductive plate 41 then moves toward the opposite direction of the axis of the fixed shaft 10. At the same time, the gap G between the arc-shaped metal plate 42 and the permanent magnet 22 becomes smaller. Therefore, pulling and loosening the pull rope 56 is able to adjust the gap between the arc-shaped metal plate 42 and the permanent magnet 22 and further adjust the braking resistance.

With reference to FIG. 4, the controller 61 includes a three-phrase full wave rectifier 62 and a DC converter 63 and has an input end connecting to the output line 333 of the tile-shaped armature 33 with three-phase alternating current and an output end outputting direct current and connecting to a control panel 64 and further to a server 65. The control panel 64 is provided for a user to input a set value and a control value is produced and sent to the server 65 which is the applied force source. In this embodiment, the applied force source is a servo gear motor 65 receiving the control value signal and rotating in a forward or reversed direction in order to adjust the gap between the arc-shaped metal plate 42 and the permanent magnet 22 and achieve the braking resistance adjustment effect.

Although particular embodiments of the invention have been described in detail for purposes of illustration, various modifications and enhancements maybe made without departing from the spirit and scope of the invention. Accordingly, the invention is not to be limited except as by the appended claims.

What is claimed is:

1. A brake device with built-in power generation mechanism and permanent magnetism eddy current applying to fitness equipment comprises:
   a fixed shaft having a fixed segment at both ends for fixing on a support base of athletic equipment;
   a driven wheel pivotally connected to the fixed shaft to transmit an external power;
   an external rotator including a flywheel and a permanent magnet fixed at an inner periphery of the flywheel, the permanent magnet provided for an electric power generation and an eddy current brake, the flywheel pivotally connected to the fixed shaft and unidirectionally rotated on the driven wheel;
   a cooling fan mounted on the flywheel and simultaneously rotated with the flywheel to produce a cooling effect;
   an internal stator including a fixing bracket joining the fixed shaft and a tile-shaped armature mounted at an outer periphery of the fixing bracket, an outer periphery of the tile-shaped armature being adjacent to an inner periphery of the permanent magnet, and a rotation of the external rotator allowing the tile-shaped armature to generate a three-phase alternating current being output by an output line connected to the tile-shaped armature;
   a brake mechanism including two pieces of magnetic-conductive plate and two pieces of arc-shaped metal plate, each of the two pieces of magnetic-conductive plate having an adjusted end and symmetrically mounted on a left and right side of the fixing bracket, each of the two pieces of arc-shaped metal plate mounted at an outer periphery of the magnetic-conductive plate, a gap being between the arc-shaped metal plate and the permanent magnet, and the rotation of the external rotator allowing the arc-shaped metal plate to generate eddy current and braking torque of magnetic resistant;
   an adjustment mechanism including a lever, a left connecting rod, a right connecting rod, a torsion spring, a pull rope holder, and a pull rope, the lever pivotally connected to the fixing bracket by a central shaft, an end of the left connecting rod and the right connecting rod pivotally connected to the adjusted end of the magnetic-conductive plate, and another end thereof pivotally connected to lever, the pull rope holder fixed on the fixing bracket, an end of the pull rope conned to the lever, and another end thereof passing through the pull rope holder and connected to the server, the torsion spring mounted on the central shaft and having both ends respectively connected to the left connecting rod and the right connecting rod, and the server pulling and loosening the pull rope to adjust the gap between the arc-shaped metal plate and the permanent magnet; and
   a controller electrically connected to the output line of the tile-shaped armature, a control panel, and a server connected to the adjustment mechanism, control panel provided for an user to input a set value and a control value being produced and sent to the server to adjust a braking resistance based on the set value, the controller then transferring the three-phase alternating current from the output line of the tile-shaped armature into direct current for a required power of the control panel and the server.

2. The brake device with built-in power generation mechanism and permanent magnetism eddy current as claimed in claim 1, further comprising a unidirectional bearing as a connection mounted between the flywheel and the drive wheel.

3. The brake device with built-in power generation mechanism and permanent magnetism eddy current as claimed in claim 1, wherein the driven wheel is a pulley.

4. The brake device with built-in power generation mechanism and permanent magnetism eddy current as claimed in claim 1, wherein the outer periphery of the tile-shaped armature is a quarter of a circumference, allowing the external rotator at low rotation speed to provide the required electric power of the control panel and the server.

* * * * *